Feb. 22, 1944.     H. M. ALDAY     2,342,444
MOUSE TRAP
Filed Jan. 30, 1943     2 Sheets-Sheet 1

Inventor
Harvey M. Alday
By Clarence A. O'Brien
and Harvey B. Jacobson
Attorneys Feb. 22, 1944.  H. M. ALDAY  2,342,444
MOUSE TRAP
Filed Jan. 30, 1943  2 Sheets-Sheet 2
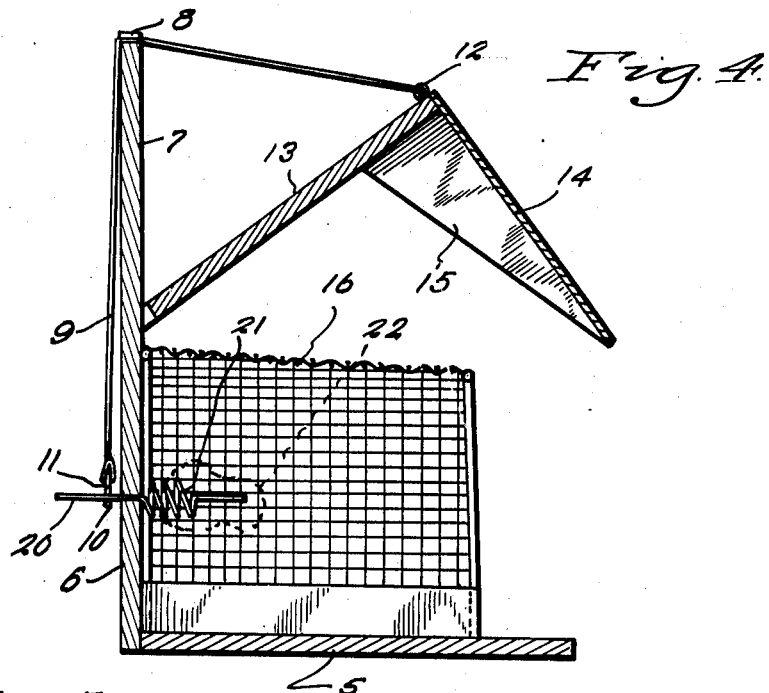
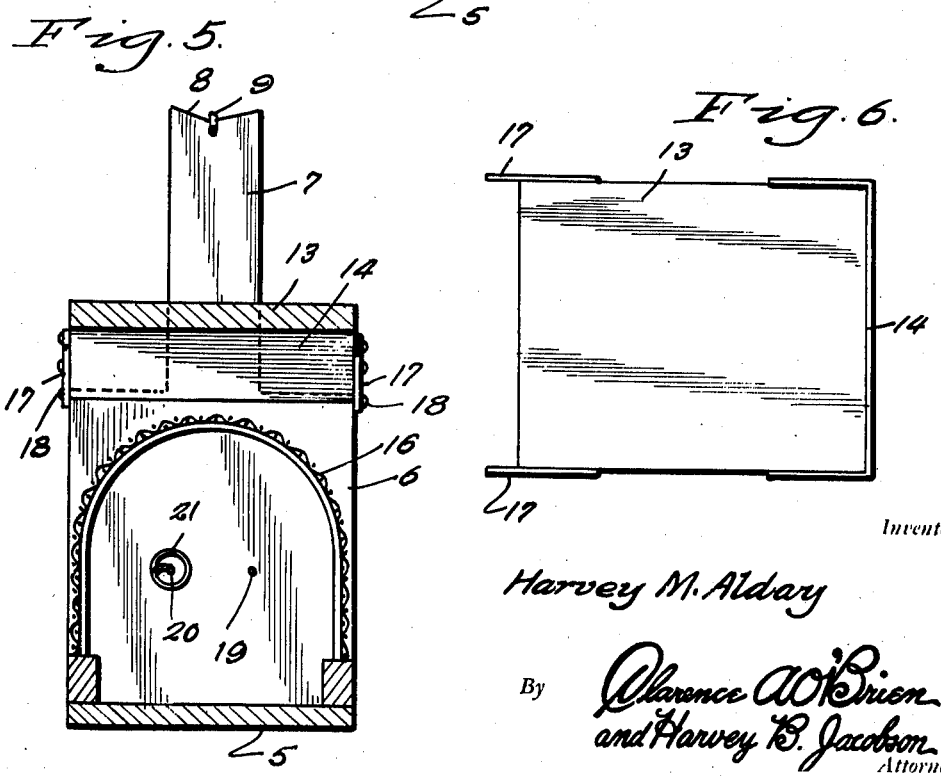
Inventor
Harvey M. Alday
By Clarence A. O'Brien
and Harvey B. Jacobson
Attorneys Patented Feb. 22, 1944

2,342,444

UNITED STATES PATENT OFFICE 2,342,444

MOUSE TRAP

Harvey M. Alday, Springfield, Mo.

Application January 30, 1943, Serial No. 474,161

2 Claims. (Cl. 43—62)

This invention relates to new and useful improvements in the art of traps and more particularly to a trap especially adapted for trapping mice.

The principal object of the present invention is to provide a mouse trap constructed in such a manner as to be quick-acting and substantially fool-proof in operation.

Another important object of the invention is to provide a trap of the character stated which is substantially safe to handle with little likelihood that a person setting the same can become injured.

Other objects and advantages of the invention will become apparent to the reader of the following description.

In the drawings:

Figure 4 is a vertical sectional view taken on the line 4—4 of Figure 2.

Figure 5 is a vertical transverse sectional view taken on the line 5—5 of Figure 1.

Figure 6 is a bottom plan view of the closure.

Figure 1:
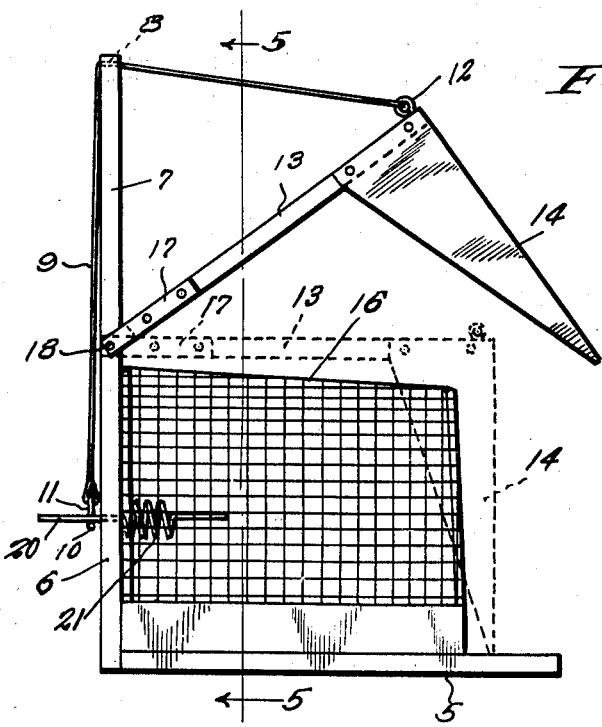
Figure 1 is a side elevational view of the trap in set position and showing the same by dotted lines in operated position.

Referring to the drawings wherein like numerals designate like parts, it can be seen that the trap structure includes a base 5 and a rear wall 6 rising from one end of the base 5. This wall 6 has a post 7 rising from the upper portion thereof and notched at its upper end as at 8 to define a crotch or guide for a cord or the like 9.

The rear end of this cord 9 is provided with a transverse trip member 10, the same being deformed to define an eye 11 through which the cord 9 can be tied.

The other end of the cord 9 is secured to an eye 12 at the forward end of a swingable top wall 13 which forms part of a closure. This closure also includes a front wall 14 preferably constructed of sheet metal, this wall 14 having downwardly tapering side walls 15 which serve to overlap the forward end portion of an arch-shaped cage 16 which is suitably secured to the base 5, with one end abutting the rear wall 6 while its other end is open and adapted to be closed by the front wall 14 when in lowered position as shown in dotted lines in Figure 1.

The side edge portions of the top wall 13 are provided at its rear end with extension members 17 which are swingably connected as at 18 to the upper portion of the rear wall 6.

The rear wall 6 is formed with a pair of openings, one to receive a pin 19, and the other one end portion of a trigger 20, this trigger 20 being formed at its intermediate portion with a spring or screw formation 21. The trigger 20 can be readily pulled through the opening in the back wall 6 in order to free the trip member 10.

Obviously, with the closure in elevated position, a piece of bait 22 can be forced on to the inner end of the trigger 20 and anchored by being screwed onto the spiral or screw formation 21.

Figure 2:
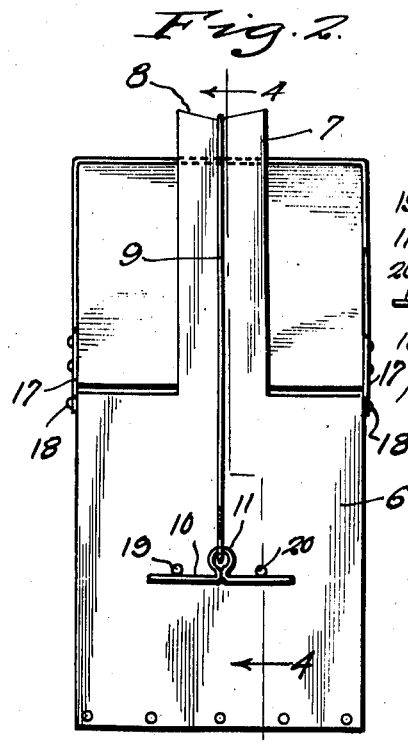
Figure 2 is a rear elevational view of the trap.
Figure 3:
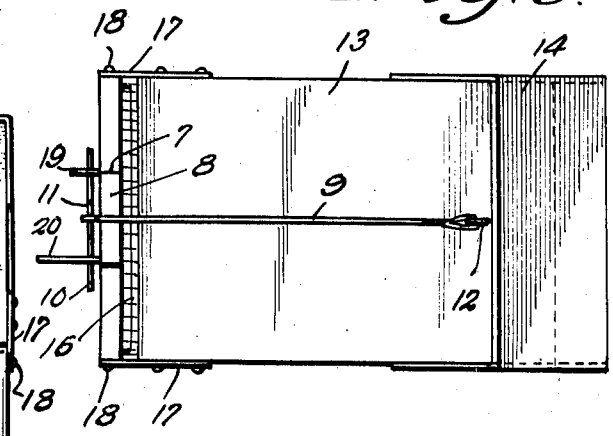
Figure 3 is a top plan view.

The trip member 10 is now set at a position underlying and abutting the pin 19 and trigger 20 at the outside of the rear wall 6 as suggested in Figure 2. This serves to hold the closure in elevated position as shown in Figures 1 and 4.

When a mouse or any rodent or animal that is to be trapped, enters the cage 16 and finds that the bait is hard to pull from the trigger 20 (in view of the anchored position on the same by means of the spiral screw 21) it will tug on the bait member 20 until it pulls the trigger 20 from the wall 6, thus releasing the trip member 10 and permitting the closure to gravitate to closed position as shown in dotted lines in Figure 1, and thus trap the creature.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A trap comprising a cage, a back wall closing one end of said cage, said cage having an open end, a post rising from said back wall, an elongated member movably mounted at one end of said back wall, a closure for the open end of said cage, said closure being mounted on the other end of said elongated member, trigger means, trip means engaged by said trigger means, connecting means between said trip means and said elongated member, and guide means at the top of said post for said connecting means, whereby said closure is maintained away from said open end of the cage when the trigger is set and closes said open end when the trigger is released.

2. A trap comprising a cage, fixed closing means at one end of said cage, said cage being open at the other end, a closure movable over said open end of the cage, an elongated member movably attached at one end to said fixed closing means and attached at the other end to said closure, an animal-moved trigger means, said trigger means providing a bait holding element and a movable pin, a stationary pin, trip means, and connecting means between said trip means and said elongated member, said trip means being adapted to abut said stationary and movable pins when the trap is set, whereby the closure is held in elevated position away from the open end of the cage.

HARVEY M. ALDAY.